United States Patent [19]
Chiappinelli

[11] 3,799,483
[45] Mar. 26, 1974

[54] RADIO MOUNTING COLLAR

[76] Inventor: Paul S. Chiappinelli, 400 W. 64th Pl., Inglewood, Calif. 90302

[22] Filed: May 18, 1972

[21] Appl. No.: 254,509

[52] U.S. Cl. .................................. 248/27, 325/352
[51] Int. Cl. ....................... A47b 67/02, G12b 9/00
[58] Field of Search ......... 248/27; 325/352; 180/90; 73/431; 220/18; 312/245, 7 R; 340/381

[56] References Cited
UNITED STATES PATENTS

| | | | |
|---|---|---|---|
| 3,685,879 | 8/1972 | Tsuji .................................. | 312/245 |
| 3,201,786 | 8/1965 | Anderson et al. ................ | 339/126 R |
| 3,248,078 | 4/1966 | Ast ..................................... | 248/27 |
| 2,862,657 | 12/1958 | Copeland et al. ................. | 248/27 X |
| 3,394,909 | 7/1968 | DiPilla .............................. | 248/27 |
| 3,412,368 | 11/1968 | Asbridge et al. ................. | 339/126 R |
| 3,278,145 | 10/1966 | Leshuk ............................. | 248/27 |

FOREIGN PATENTS OR APPLICATIONS 148,439    1/1955    Sweden................................ 73/431

Primary Examiner—J. Franklin Foss
Attorney, Agent, or Firm—John E. Kelly, Pastoriza & Kelly

[57] ABSTRACT

An assembly for removably mounting a radio within an automobile console includes a special rectangular frame collar interposed between the radio and a rectangular framework secured within a well of the console.

The collar is shaped to stably and snugly hold the radio and position it at some desired predetermined height relative to the console. Resilient clips attached to the radio and locking lips of the collar coact to releasably lock the radio in position.

3 Claims, 4 Drawing Figures

RADIO MOUNTING COLLAR

BACKGROUND OF THE INVENTION

This invention generally relates to radio mounts and more specifically to mounting assemblies for automobile radios.

Many automobiles with spaced front seats include consoles oriented between the seats to mount certain vehicle controls and serve as an article holding device. Many consoles are formed in their tops with openings for accommodating an ashtray or alternatively seating a radio.

Attempts to insert conventional radios in console openings are often at least partially unsuccessful because of the incompatibility and size mismatch between the radio and console well or space underlying the console opening.

The radio may project upwardly too far and/or be too loose within the opening which is both unsightly and causes annoying noises. Moreover, under conventional practices once a radio is secured within the console well it is difficult to remove the radio for servicing without causing structural damage.

BRIEF SUMMARY OF THE INVENTION

Briefly stated the present invention is a radio mounting assembly for an automobile that can be quickly and easily installed and partially disassembled so that a radio may be conveniently removably positioned and then easily released for servicing for example.

In its broader aspects the radio mounting assembly includes a mounting frame defining a generally rectangular cavity and having an upper section forming a seat. A mounting collar defines a generally rectangular opening and includes a lower portion inserted within the mounting frame cavity. The collar has an upper portion formed on its external periphery with stop means engaged on the seat and formed on its top edge with inwardly directed lips. A radio has a housing equipped with releaseable locking means engaged with the locking lips.

The mounting collar upper portion has a skirt that is thicker than the mounting collar lower portion, and, the stop means is formed by the base of the skirt. The base of the skirt constitutes a substantially continuous step engaged at substantially all points with the seat. The skirt depth is dimensioned to hold the radio at a predetermined height above the mounting frame.

The releaseable locking means is preferably constituted by a pair of resilient clips formed with locking grooves that receive and resiliently retain corresponding locking lips. Shallow spaces formed between the radio side walls and the mounting collar are sized to accommodate the clips which remain concealed when the components are fully assembled for use.

The radio has a detachable face plate so that when the face plate is removed access can be gained to the resilient clips for releasing them from the locking lips.

The mounting frame has a lower section formed with a first set of securement holes and the lower portion of the mounting collar is formed with a second set of securement holes that register with the first set of securement holes, enabling screws or the like to couple both the mounting frame and mounting collar to surrounding structure.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figures 1, 2:
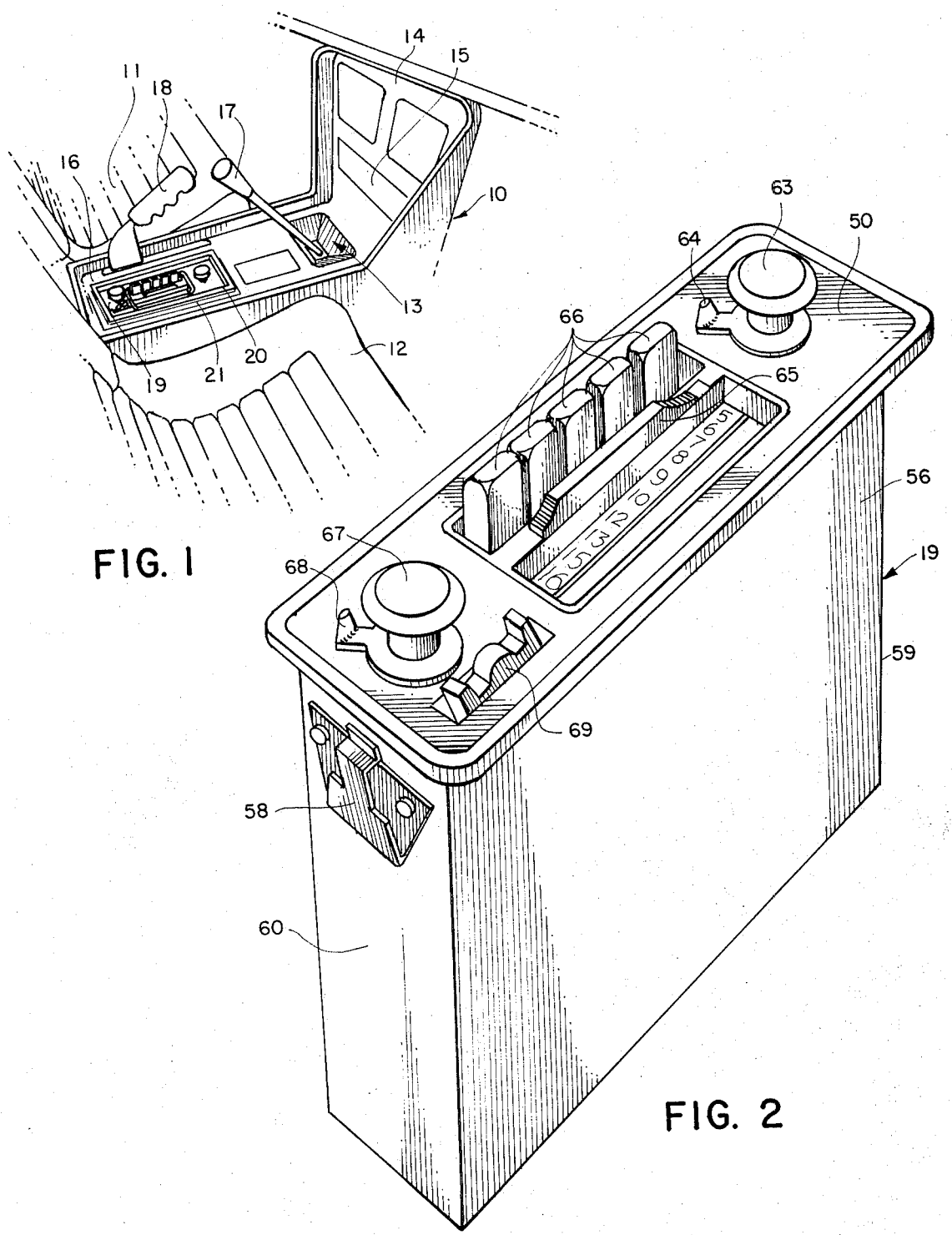
FIG. 1 is a perspective sectional view of an automobile interior with a console, showing a radio mounting collar constructed in accordance with this invention.
FIG. 2 is a perspective view of a radio whose opposing side walls are equipped with locking clips.

Referring now primarily to FIG. 1, the forward occupant region 10 of an automobile is furnished with a pair of laterally spaced seats 11 and 12 which may be bucket seats for example. Between the seats 11 and 12 is a longitudinally extending and generally conventional console 13 for mounting various vehicle controls and holding objects. An upright section 14 of the console 13 includes a panel for mounting airconditioning unit louvers 15 or the like.

A relatively lower and level section 16 of the console 13 houses a gear box from which projects a gearshift lever 17. A parking brake 18 is located rearwardly of gearshift lever 17. An AM-FM multiplex stereo radio 19 is positioned for use generally to one side of the parking brake 18. A mounting frame 20 is installed within a well defined by a part of the interior of console 13, the well being approximately 5 ½ inches deep for many standard automobile consoles. The well is accessible through an opening in top wall or level section 16 of console 13. Held between radio 19 and mounting frame 20 is a mounting collar 21.

In the case of Citroen SM automobile the well depth is approximately 5 ½ inches deep and the radio depth is approximately 6 inches which presents an annoying installment and aesthetic problem. The poor or inaccurate fit causes the radio to project upwardly instead of allowing a desired relatively flush fit.

Figure 3:
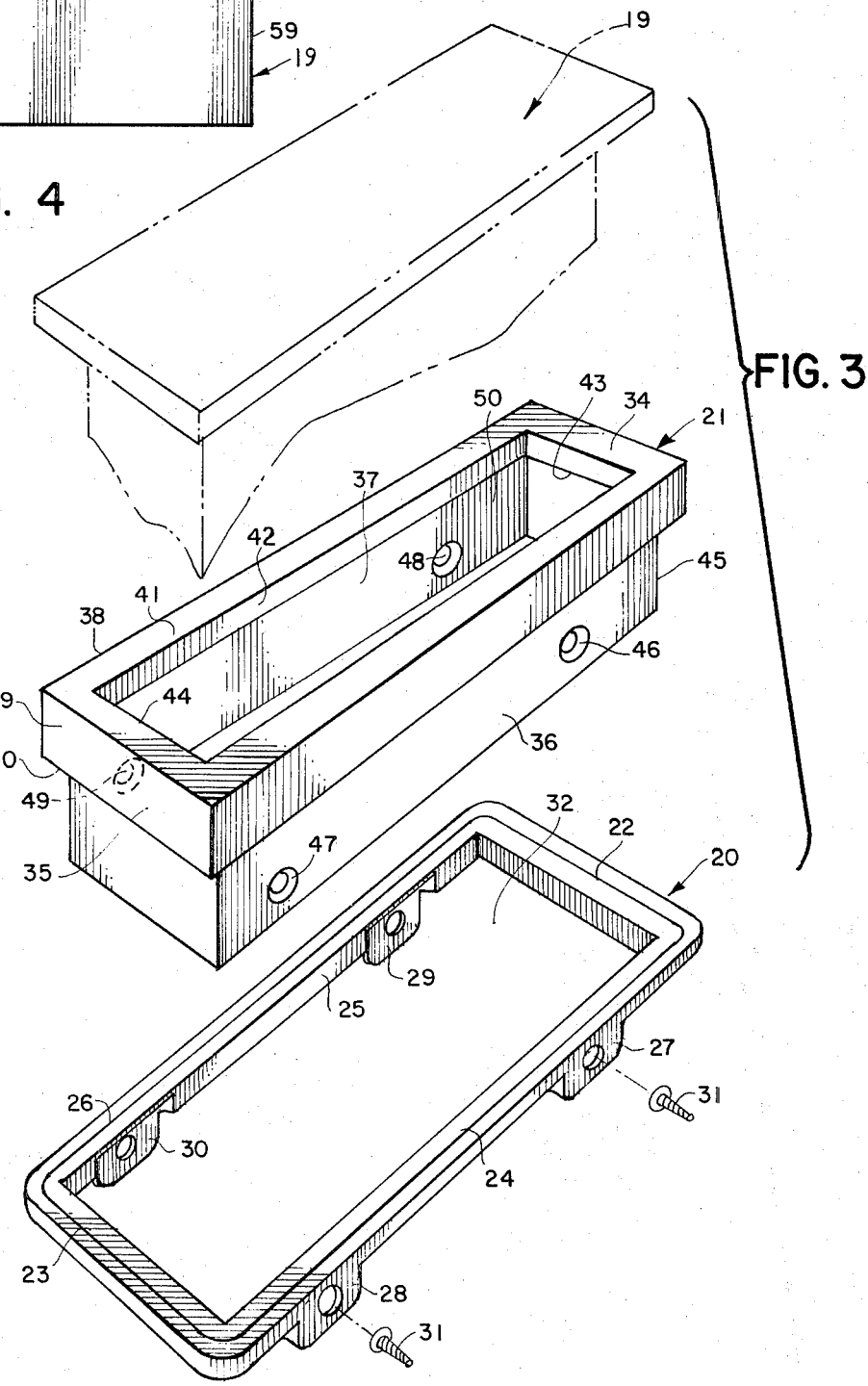
FIG. 3 is a perspective exploded view showing the radio, a mounting collar constructed in accordance with this invention and a mounting frame; and, FIG. 4 is an elevational sectional view showing the radio, mounting collar and mounting frame assembled together for use.

Referring now primarily to FIG. 3 the mounting frame 20 has a relatively short front bar 22 and a relatively short rear bar 23 interconnected by a pair of relatively long side bars 24 and 25. These four bars constitute a rectangular frame. The upper surfaces of bars 22, 23, 24 and 25 define a seat 26 of rectangular shape. Side bars 24 and 25 are formed with depending lugs 27, 28, 29 and 30 that define securement holes. Four securement screws 31 are provided for associated securement holes to aid in tightly joining the mounting frame 21 to the side wall structure defining the well of the console 13. The screws 31 would be oriented and tightened into their intended positions by placing them within a rectangular cavity 32 defined by the rectangular frame and using a suitable wrench or screwdriver.

The mounting collar 21 has a front wall 34, a rear wall 35 and a pair of interconnecting side walls 36 and 37. The external periphery of the upper portion 38 of mounting collar 21 is formed with a skirt 39 terminating at its lower edge or base with stop means 30. The stop means 40 is defined by a step extending continuously around the mounting collar 21.

The mounting collar upper portion 38 has a top wall 41 with an inwardly directed edge 42. The segments of the inwardly directed edge 42 corresponding with front walls 34 and rear wall 35 constitute a pair of locking lips 43 and 44 respectively.

The lower portion of the mounting collar 21 is sized for insertion within the rectangular cavity 32 of mounting frame 20. Four securement holes 46, 47, 48 and 49 extend through side walls 36 and 37 and register with the mounting frame securement holes 27, 28, 29 and 30 respectively.

The generally rectangular opening 50 of mounting collar 21 is shaped to accept and accommodate the radio 19 and, in a similar manner, the rectangular cavity 32 of mounting frame 20 is sized to accept and accommodate mounting collar lower portion 45. The stop means 40 or step overlies and rests upon seat 26. The stop means 40 engages the seat 26 at substantially all points.

The skirt 39 acts as a shim or spacer and its depth may be adjusted or varied in order to hold the radio 19 at a desired height above the console 13 and mounting frame 20.

Figure 4:
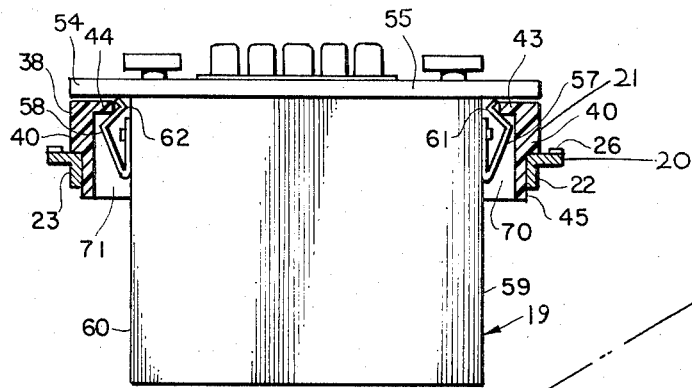

Referring primarily to FIG. 2 and FIG. 4, the radio 19 has a removable face plate 55 detachably secured to general housing 56 which, when installed for use, is concealed beneath mounting collar 21 and disposed within the well of console 13. The front wall 59 and rear wall 60 of the housing 56 retain a pair of metal clips 57 and 58 respectively. The metal clips 57 and 58 are basically identical leaf springs of special configurations that are formed with locking grooves 61 and 62 respectively.

The radio 19 has an on-off and volume control 63 and an associated tone control 64. An AM-FM band switch 65 is arranged adjacent a plurality of push button controls 66. A selector control 67 has an associated balance control 68. A stereo-mono switch 69 is provided.

When the radio 19, mounting collar 21 and mounting frame are fully assembled then the metal clips 57 and 58 are disposed within shallow spaces 70 and 71 defined between radio housing 56 and the mounting collar 21.

The mounting collar 21 and clips are relatively sized and spaced so that the locking lips 43 and 44 make snap fitting engagement within the locking grooves 61 and 62. The locking action causes the radio 19 to be snugly and stably positioned with overhang portions 54 of the radio face plate 55 generally seated upon at least some areas of the mounting collar top wall 41.

OPERATION

Keeping the above construction in mind it can be understood how previously described disadvantages of automobile radio mountings are overcome or substantially eliminated by the present invention.

To install the overall radio mounting assembly the mounting collar lower portion 45 is inserted within rectangular cavity 32 until the stop means 40 engages and becomes seated upon the seat 26 of mounting frame 20. Then four securement screws 31 are screwed into the registering securement holes so that the mounting frame 20 and mounting collar 21 become fixed to wall structure that partially defines the well within the console 13.

The radio 19 is thrust downwardly into within the rectangular opening 50 until the locking lips 43 and 44 make snap fitting engagement within the locking grooves 61 and 62. At this point the overhang portion 54 of the radio face place 55 become generally seated upon some areas of mounting collar top wall 41.

The radio 19 may be rather easily lifted from the well of console 13 for servicing, repair or replacement purposes. To gain access to it, the knobs or controls 63 and 67 are torqued and uncoupled to free the face plate 65 after which a screwdriver or the like may be used to pry the spring clips 57 and 58 inwardly against the radio housing 56. The radio 59 may then be grasped and slipped upwardly out of the mounting frame 20 and mounting collar 21.

From the foregoing it will be evident that the present invention has provided a radio mounting assembly in which all of the various advantages are fully realized.

What is claimed is:

1. An automobile radio mounting assembly comprising:
    a. a mounting frame defining a generally rectangular cavity and having an upper section forming a seat and a lower section formed with a first set of securement holes;
    b. a radio having a housing equipped with releaseable locking means in the form of a pair of resilient clips with grooves, and, a detachable face plate;
    c. a mounting collar defining a generally rectangular opening and having;
        c-1. a lower portion inserted within the mounting frame cavity formed with a second set of securement holes that register with the first set of securement holes to assist in permitting the mounting frame and mounting collar to be coupled to a surrounding structure;
        c-2. an upper portion having a skirt that is thicker than the mounting collar lower portion and whose base constitutes stop means engaged on the seat;
        c-3. a pair of inwardly directed locking lips formed by the top edge of the mounting collar upper portion; and,
    d. shallow spaces formed between the radio and mounting collar of a size sufficient to accommodate the clips so that when the face plate is removed from the radio then access may be gained to the shallow spaces in order to contact and release the locking lips from the locking grooves.

2. The structure according to claim 1, wherein;
    the base of the skirt constitutes a substantially continuous step engaged at substantially all points with the seat.

3. The structure according to claim 1, wherein;
    the skirt depth is dimensioned to hold the radio at a predetermined height above the mounting frame.

* * * * *